Patented Feb. 26, 1929.

1,703,465

UNITED STATES PATENT OFFICE.

HORACE GREELEY WOODHEAD, OF CHICAGO, ILLINOIS, ASSIGNOR TO B. F. GUMP CO., OF CHICAGO, ILLINOIS, A CORPORATION OF ILLINOIS.

PROPORTIONAL FEEDING MACHINE.

Application filed December 20, 1922. Serial No. 608,118.

My invention relates to the preparation of mechanical mixtures which contain definitely predetermined proportions of the constituent materials.

In the manufacture of prepared foods it is extremely necessary that actual proportions of the materials entering into them should be maintained in accordance with the formulas advertised and placed upon the packages. Regulators for controlling the feeding of component material have been devised so that, each element that enters into the mixture being fed in proper relative amount and being conducted to a mixing conveyor, an accurately compounded and blended product may be obtained. But, while such devices are in use for preparing grain foods and the like, it has been thus far impossible, satisfactorily, to uniformly and accurately feed chemicals like salt in the preparation of such feeds and also to feed salt, sodium, bicarbonate, phosphate, and the like, in the preparation of food stuffs such as prepared flours and baking powder. The reason is that practically all the chemicals which are used are more or less hygroscopic and, by caking or crystallization or the naturally adherent character thereof make the operation of the feeding devices irregular and uncertain. It is further true that, particularly in the case of making feed and food stuffs, the chemical is relatively small in amount compared with the other ingredients and it is difficult to distribute it uniformly throughout the entire bulk.

I have discovered that several elements of manipulation of the product should be taken into consideration when seeking to produce a uniform and regular flow of material of this class: reduction to a condition of uniform fineness; producing a flow and establishing a bulk or mass of substantially uniform density; and finally removing successive portions under conditions which will establish a substantially uniform flow of material.

As a means of applying these principles and of putting them into effect I have invented a machine, the object of which is to provide a feeding mechanism and regulator which may be adjustably controlled to deliver any predetermined amount of the desired chemical whether large or small, accurately and in a practically continuous stream, that will be adapted to deliver such material in comparatively fine condition and adapted to be uniformly mingled with the other ingredients. Further, my machine is simple in construction and can be readily opened to remove the chemicals during such time as the machine is not in operation thereby avoiding the tendency to corrode the machine and to cause lumps or cakes of material to be formed in the machine itself.

Figure 1:
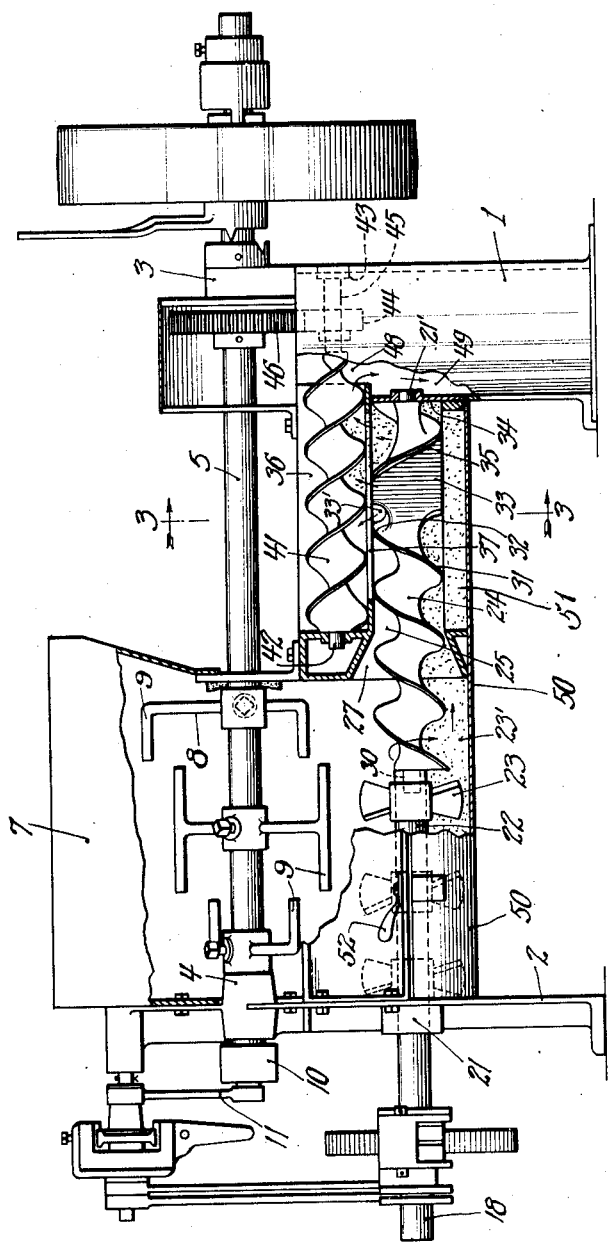
Figure 2:
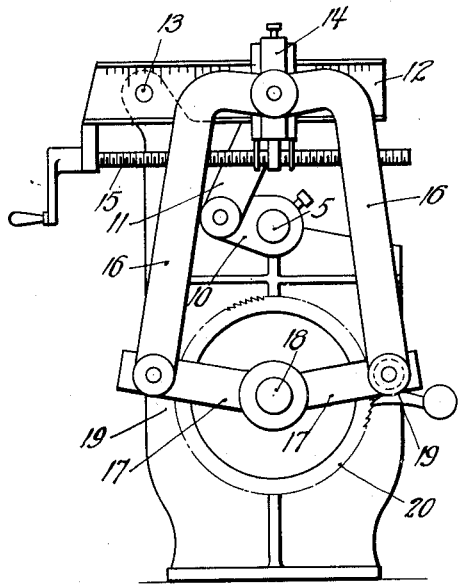
Figure 3:
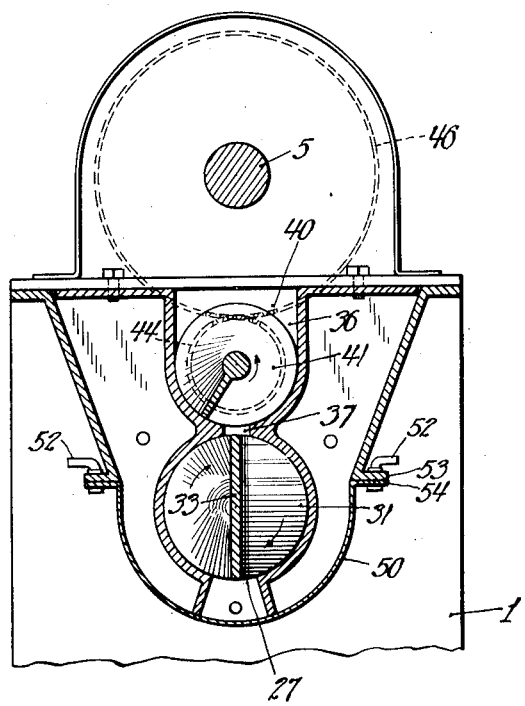
Figure 4:
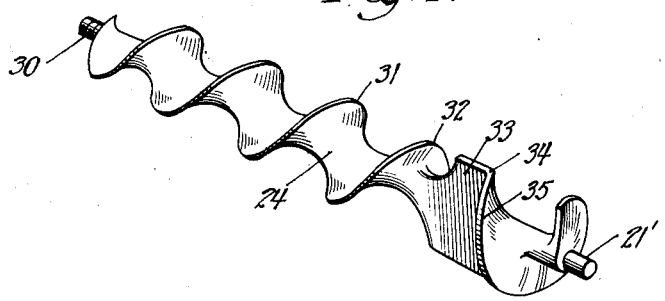

I can do this by means of the mechanism hereinafter described in which Fig. 1 shows a side elevation thereof, the feeding mechanism being in central longitudinal section. Fig. 2 is an end view showing the speed-regulating device. Fig. 3 is a section on the line 3—3 of Fig. 1. Fig. 4 shows a special form of conveyor.

Further describing my invention with reference to the drawings in which like characters of reference denote like parts throughout: 1 and 2 are standards or logs forming part of the framework of my machine upon which, in the bearings 3 and 4 is journaled the main shaft 5. The hopper 7 is carried by the framework and within the hopper, on the main shaft are stirring arms 8 which have transverse members 9 extended from the ends thereof. Said arms 8 are preferably of unequal length thus causing the extensions to operate in circles of different radii and thus more completely break down and pulverize the material in the hopper preparatory to the operation on such material by the stirrers and the other portions of the mechanism. A crank 10 on shaft 5 operates a pitman 11 which actuates the adjustable feed mechanism. This is shown in Fig. 2 and is substantially the same as that shown in Patent No. 1,215,506, for a variable speed mechanism, issued to Emil R. Draver, February 13, 1917. It is unnecessary to further describe the same except to say that the graduated arm 12 is pivoted at 13 to the frame, and that the pitman 11 is connected on the rear portion of the said arm to a pivot (not shown in this drawing.) The block 14 is slidably mounted on the graduated arm 12 on which it is adjusted by means of the screw device 15 thereby varying the length of throw of the connecting bars 16. Said bars operate the arms 17 pivoted on shaft 18 and control the action of dogs 19 which engage the ratchet wheel 20.

The shaft 18 is journaled in the bearings 21 and 21'. One portion of it, 22, is adapted to receive the paddles or diagonally winged stirrers 23 in the agitation chamber 23', and the other portion of it, 24, consists of a single-pitched screw conveyor which revolves in an elongated circular chamber 25, the receiving end of which at 27 is funnel-shaped. While the shaft 19 may be made in one piece I prefer to make the portion 24 in a separate piece as shown in Fig. 4 and connect the two portions by means of a threaded extension 30 which takes into the corresponding end of portion 22. Conveyor portion 24 of said shaft, which for reasons hereafter explained and for convenience I will call the impaction conveyor, shows primary left-hand flanges 31 up to the point 32, at which occurs a flattened portion or paddle 33 comprising radial extensions in each direction from the longitudinal axis. For the further length within its casing, and up to the point 34 a flange 35, which is the reverse of the main flange is provided. The object of this construction is to prevent the forcing of material into the end of the chamber and cause it to turn backwardly to the flattened portion by which a flow of substantially uniformly impacted material is produced into an upper conveyor chamber 36 through the slot 37, said flattened portion cooperating with the screw flanged portion in such action.

In said upper conveyor chamber 36, over the chamber last described and axially aligned with the impaction conveyor therein is a double-flanged screw conveyor 41 which is journaled at one end in the bearing 42 and at the other end in bearing 43. A pinion 44 on shaft 45 which is an extension of conveyor 41, meshes with the gear 46 on the main shaft 5. The relation of the said gears should be such that the conveyor 41 shall operate at all times at a speed higher than that of the impaction conveyor.

When material is placed in the hopper 7 the rotation of the stirring arms 8 and the transverse extensions operating in the circumferences of different circles will tend to prevent packing of the material which is further stirred by the paddle arms 23, the action of which is to stir and loosen the material and yieldingly to convey it to the impaction conveyor by which it is longitudinally moved through the funnel-shaped opening into the impaction chamber 25. The rotation of the spiral flanges of conveyor 24 tends to distribute a part of the material through the slot 37 while the principal body thereof passing to the flattened portions 33 will be directly forced through said slot. Surplus material going beyond the flattened portion will be turned back by the reverse flange 35 and also upward through the slot 37 or carried backward to the flattened portion. It will be seen that a uniform condition of material, both in texture and density will be presented as it passes through the slot 37. The relatively rapid rotation of conveyor 41 causes the lower edges of the flanges adjacent to the slot to exercise a rapidly shearing motion to remove successively small portions of material as it is passed through the slot 37 and pass them to the point 48 at which they are discharged in a substantially uniform stream by the spout 49 and conveyed to the mixture to be made. It will be seen that a very accurately determined amount of material can be conveyed to the slot 37 and that the rapid shearing and mixing action of the conveyor 41 above the slot will give a practically uniform stream of material which will flow at an accurately predetermined rate.

A removable retaining pan 50 extends between the legs 1 and 2 and forms the bottom of the agitation chamber 23' and also provides a closure for the lower extension 51 of impaction chamber 25. It is secured in place by fasteners 52 which engage flanges 53 and 54.

I have stated the general principles of my invention and further illustrated them by reference to a practical and operative machine which I have invented for the purpose of carrying them into effect. But the principles of my invention are independent of the specific mechanism shown and may be carried into effect by many different instrumentalities and diverse devices. They may also be applied to the handling of other materials and for other purposes than that mentioned. I am not, therefore, to be limited to the materials, objects or forms of mechanism shown.

It is further to be remarked that the machine should be constructed of or coated with such material that the substances to be fed will not combine with it directly, or be instrumental in causing oxidation.

I claim:

1. In a proportional feeding machine; a plurality of parallel chambers connected by a long and relatively narrow small opening, means operating in one chamber to force feed material through said opening into the other chamber and means in the second chamber for successively removing and ejecting portions of said material.

2. In a proportional feeding machine; a plurality of parallel chambers connected by a long and relatively narrow small opening, means operating at controllably variable speed in one chamber to force feed material through said opening into the other chamber, and means in the second chamber for successively removing and ejecting portions of said material.

3. In a proportional feeding machine; a plurality of elongated chambers substantially parallel to each other connected by a common long and relatively narrow lateral opening, means operating in one of said chambers to force material through said opening into the other chamber and uniformly acting means in the second chamber for successively removing and ejecting portions of said material.

4. In a proportional feeding machine; a plurality of elongated chambers substantially parallel to each other connected by a long and relatively narrow lateral opening, a screw conveyor in one of said chambers to force material through said opening into the other chamber and a second screw conveyor in the second chamber for successively removing and ejecting portions of said material.

5. In a proportional feeding machine; a plurality of elongated chambers substantially parallel to each other, connected by a long and relatively narrow lateral opening, a screw conveyor operating in one of said chambers to force material through said lateral opening into the other chamber and a screw conveyor in the second chamber for longitudinally removing and ejecting portions of said material.

6. In a proportional feeding machine; a plurality of elongated chambers substantially parallel to each other, connected by a long and relatively narrow lateral opening, a screw conveyor in one of said chambers, means for causing said conveyor to move at varying speeds to force material through said opening into the other chamber, and a screw conveyor in the second chamber acting at a uniformly higher speed than that of the conveyor in the first chamber, to remove and eject material from the second chamber.

7. In a proportional feeding machine; a plurality of elongated chambers substantially parallel to each other, connected by a long and relatively narrow lateral opening, a screw conveyor in one of said chambers, means for causing said conveyor to operate at varying speeds to force material through said opening into the other chamber, and means in the second chamber having a capacity greater than the capacity of the said screw conveyor to remove and eject material from the second chamber.

8. In a proportional feeding machine; a plurality of elongated chambers substantially parallel to each other, connected by a common long and relatively narrow lateral opening, a single pitched conveyor in the lower chamber adapted to be moved at variable speed to force material through said opening, and a double-pitched conveyor in the upper chamber to receive said material and eject it in a substantially uniform flow.

9. A conveyor element for proportional feeding machines comprising a casing having a closed end and slotted sides and a screw conveyor therein provided with reversely-turned, spiral flanges at the opposite ends.

10. A conveyor element for proportional feeding machines comprising a casing having a closed end and slotted sides and a screw conveyor therein provided with reversely-turned, spiral flanges at its opposite ends, said flanges being interrupted and connected by flattened portions extended radially from the longitudinal axis of said element.

11. In a proportional feeding machine; an elongated conveyor chamber, a screw conveyor operating in said chamber, an agitation chamber having a shaft longitudinally connected to said screw conveyor, paddle arms mounted on said shaft and adapted to convey material to the screw conveyor, a receiving hopper above the first named shaft, a shaft in said hopper, arms of unequal length mounted upon and operable by said last named shaft, and transverse members extended laterally from the ends of said arms adapted to move in circles of unequal radii.

In witness whereof I have hereunto set my hand at Chicago, Illinois, this 16th day of December, 1922.

HORACE GREELEY WOODHEAD.